3,240,700
PROCESS OF DRILLING A WELL
Dixon W. Peacock, Bartlesville, Okla., assignor to Phillips Petroleum Company, a corporation of Delaware
No Drawing. Filed Apr. 25, 1962, Ser. No. 189,957
6 Claims. (Cl. 252—8.5)

This invention relates to drilling fluids. In another aspect it relates to drilling fluids, such as aqueous, oil-base, and emulsion types, used in drilling oil and gas wells, and other deep wells. In a further aspect, it relates to a method of drilling wells with such well drilling fluids. In a further aspect it relates to a novel material, especially useful as a drilling fluid additive, and to a method of preparing such material.

In the art of drilling wells to tap subterranean deposits, such as gas or oil, especially when drilling by the rotary method wherein cuttings must be removed from the borehole, it is necessary to use a drilling fluid (sometimes called "drilling mud"). The drilling fluid is pumped down a hollow drill string within the borehole, across the drill bit which is attached to the lower end of the drill string, and is then normally circulated upwardly through the annular space between the drill string and the borehole. Circulation of the drilling fluid in this manner removes the cuttings from the borehole, lubricates and cools the drill bit, seals the walls of the borehole with a thin, impervious layer of solid material or filter cake, and applies a hydrostatic head to the formation to counter-balance formation pressures.

In addition to having desirable rheological properties such as viscosity and gel strength, it is important that the drilling fluid exhibit a low rate of filtration or fluid loss, that is, the drilling fluid should deposit on the wall of the borehole a thin filter cake and permit little if any loss of its liquid phase to the formation penetrated, as it is well known to those skilled in the art.

Accordingly, an object of this invention is to provide a novel drilling fluid. Another object is to provide an improved method of drilling oil and gas wells, or other deep wells, using a novel drilling fluid. Another object is to provide a novel material particularly useful as a drilling fluid additive to control fluid loss. And a further object is to provide a method for preparing such novel material. Further objects and advantages of this invention will become apparent to those skilled in the art from the following discussion and appended claims.

In one of its broader aspects, I have discovered that superior drilling fluids, such as the aqueous, oil-base and emulsion types, can be prepared by adding to the fluid medium or carrier of the drilling fluid an ester of petroleum sulfonic acid and an aryl polyether alcohol, preferably an alkyl aryl polyether alcohol. Such alcohols can have the following general structural formula:

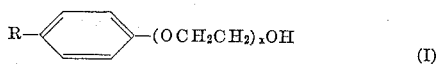

(I)

where R is hydrogen or an alkyl group, preferably having from 1 to 20 carbon atoms, and wherein $x$ is an integer from 1 to 30, preferably from 7 to 10.

Representative alkyl groups (R in Formula I) include methyl, propyl, isopropyl, butyl, pentyl, isopentyl, hexyl, heptyl, octyl, nonyl, decyl, and the like. A preferred alkyl aryl polyether alcohol which can be used to form said ester has the following general formula:

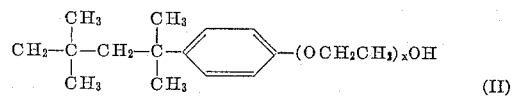

(II)

wheren $x$ is an integer from 7 to 10.

Petroleum sulfonic acids and their preparation are well known to those skilled in the art. They are generally formed by treating petroleum fractions with sulfonating agents, such as concentrated sulfuric acid, oleum, sulfur trioxide, and chlorosulfonic acid. As examples of such petroleum fractions, mention can be made of the phenol extract oil and the sulfur dioxide extract oil of lubricating oil cuts. Lubricating oils are generally used in preparing these petroleum sulfonic acids, and as such will be commonly used in this invention. The preferred lubricating oil stock used in the preparation of these petroleum sulfonic acids for this invention are bright stocks with a viscosity of at least 90 SUS at 210° F., more preferred bright stocks being those deasphalted and solvent-refined petroleum fractions having a viscosity of 140 to 720 SUS at 210° F. A hydrocarbon stock which I have found especially suitable in preparing these esters is the phenol extract oil of a propane fractionated, solvent-refined, de-waxed Mid-Continent oil of 200 to 230 SUS at 210° F. with a viscosity index of 85 to 100, or higher.

Sulfonation of petroleum fractions is well known in the art and details of such procedures will not be discussed herein in the interst of brevity. Attention is directed, for example, to U.S. Patent 2,864,857, issued December 16, 1958, to W. B. Whitney, which discloses details in sulfonating oils with chlorosulfonic acid. In preparing the esters used as drilling fluid additives in this invention I prefer to first react the hydrocarbon stock with liquid sulfur trioxide (e.g., Sulfan) to form the petroleum sulfonic acids and then to convert the latter to the petroleum sulfonyl chlorides by reaction with chlorosulfonic acid. The sulfonation reaction is preferably carried out under anhydrous conditions, for example, by carrying out the sulfonation in the presence of a suitable amount of thionyl chloride (e.g., 0.5 to 5 moles per mole of sulfonating agent). The sulfonation reaction can be carried out in a suitable inert non-aromatic diluent such as carbon tetrachloride, chloroform, cyclohexane, diesel fuel, kerosene and normally liquid low-boiling normal paraffinic hydrocarbons, preferably having 5 to 8 carbon atoms per molecule, such as pentane, hexane, heptane and octane. The petroleum sulfonic acids can be dispersed in such diluents to provide concentrations of 15 to 50 weight percent, preferably 20 to 35 weight percent. Ethylene dichloride is a preferred diluent.

As mentioned above, the esters of this invention are esters of petroleum sulfonic acid and an alkyl aryl polyether alcohol. The preferred way of preparing these esters is by reacting the alkyl aryl polyether alcohol (preferably mixture thereof) with the petroleum sulfonyl chlorides in the presence of an aqueous solution of a base, such as an alkali metal hydroxide, e.g., sodium or potassium, to react with the gaseous hydrogen chloride liberated by the reaction. This esterification reaction can be carried out in the sulfonation reaction effluent. The esterification can be carried out over a wide temperature range, generally 0 to 150° C., preferably 50 to 100°, usually at the reflux temperature of the reaction mixture.

The alkyl aryl polyether alcohols used in preparing the novel esters of this invention are commercially available and are sold under the trademark Triton, such as Triton X–45, Triton X–114, Triton X–100, and Triton X–102. These products are actually mixtures with respect to the polyoxyethylene chain length ("$x$" values given in the above structural formulas are the average chain lengths). These alcohols are nonionic and their water solubility is dependent on the hydrophilic nature of the ether linkages in the polyoxyethylene chain, the higher the "$x$" value the greater the solubility in water.

The esters of this invention have a wide range of dispersibility in water and oil, and will form true solutions with the carrier of the drilling fluid, or colloidal suspensions, or suspensions in which the esters are relatively insoluble though finely divided and dispersible. These esters are dispersed in either the aqueous or oil phase of the drilling fluids and impart low fluid loss thereto and desirable rheological properties. The amount of ester added to the drilling fluid will vary and be dependent upon the degree of reduction in fluid loss desired, the particular carrier of the drilling fluid, that is, water, oil, or emulsion. It has long been customary in rotary well drilling operations to subject the drilling fluid to simple routine tests from time to time and these tests are sufficient to indicate the relative amounts of ester which are necessary to reduce the fluid loss. Generally, the amount of ester employed will be sufficient to reduce the fluid loss of the drilling fluid and form a relatively thin, impervious filter cake on the wall of the well, and yet insure a viscosity such that the drilling fluid can be readily pumped and circulated. In general, the amount of ester added to the drilling fluid will be in the range of about 0.1 to 20 pounds per barrel, preferably about 1 to 10 pounds per barrel (42 U.S. gallons), of drilling fluid.

For water-in-oil emulsion systems, the amount of water to be employed can generally range from as low as 1 percent by weight of the final drilling fluid to 60 percent by weight, and preferably less than 40 percent by weight. For oil-in-water emulsion systems, the amount of water will be in the range from about between 99 to 60 percent by weight of the final emulsion and the amount of oil will be in the range from 1 to 40 percent by weight of the final emulsion.

The oil component used in preparing the oil-base and emulsion drilling fluids of this invention can be any hydrocarbon normally used for this purpose in the art, such as diesel fuel, crude oil, kerosene, gas oil, heavy fuel oil, various petroleum fractions, and the like.

Although the drilling fluids of this invention need only contain the water-dispersible and oil-dispersible ester as the material necessary to obtain low fluid loss and desirable rheological properties, it is within the scope of this invention to add clays or other finely divided inorganic solids. In addition, materials commonly used for weighting purposes can be added, including finely divided limestone, barite, lead sulfide, oyster shell, or the like. For emulsion systems any suitable conventional emulsifying agent, such as the alkaline earth metal salts of saponifiable oils such as vegetable oil, wood oils, fish oils and the like, can be employed. Other applicable emulsifying agents include Dresinates, alkali and alkaline earth salts of lignin, alkali metal salts of carboxymethylcellulose, and the like. In general, the emulsion drilling fluids prepared according to this invention are relatively stable tight emulsions.

The following examples and discussion are illustrative of this invention and specific details for preparing the esters and drilling fluids of this invention are merely illustrative of preferred embodiments thereof and are not to be construed as unduly limiting this invention.

A 100 gram quantity of a phenol extract oil of a solvent-refined dewaxed lubricating oil fraction derived from a Mid-Continent oil and having a viscosity of 203 SUS at 210° F. and a viscosity index of 93 was dissolved in 1000 cc. of n-hexane in a vessel. The vessel was then placed in an ice bath and 30 cc. of thionyl chloride was added at about 0° C. The mixture was agitated during the addition of 30 cc. of chlorosulfonic acid which was added at a rate such that the temperature was controlled within the range of 0 to 5° C. The addition of the chlorosulfonic acid took about 30 minutes and was then stirred for another 30 minutes. Thereafter, 10 cc. of water was added to the reaction mixture, stirring was discontinued, and the ice bath was replaced by a water bath and vacuum of 24" of mercury was maintained on the reaction vessel overnight to remove some of the hexane. Stirring was started again and to the reaction mixture was added 450 cc. of water, 52 grams of sodium hydroxide, 53.7 grams of Triton X–114 and 149.4 grams of Triton X–100. Heat was applied until all the hexane was removed and reflux conditions were maintained for three hours. The product was recovered and dried in a vacuum oven over the weekend.

The ability of the above-prepared ester to lower the fluid loss of drilling fluids was then evaluated by adding the ester to an aqueous drilling fluid and to oil-in-water emulsion drilling fluids, and the water loss properties of such fluids (determined according to A.P.I. Code No. 29) were compared with drilling fluid controls containing no ester additive. The composition of these drilling fluids and the results obtained are set forth in Table I.

Table I

| | Runs | | | | |
|---|---|---|---|---|---|
| | 1 | 2 | 3 | 4 | 5 |
| Water, cc | 350 | 350 | 350 | 350 | 350 |
| McCracken Clay, g | 37.2 | 37.2 | 37.2 | 37.2 | 37.2 |
| No. 2 Diesel Oil, cc | 0 | 0 | 15 | 15 | 15 |
| Sodium Carboxymethylcellulose, g | 0 | 0 | 0 | 0 | 0.5 |
| Ester, g | 0 | 12.5 | 0 | 12.5 | 12.5 |
| Water Loss, cc | 95.5 | 19 | 77 | 5.8 | 2.6 |

The results tabulated in Table I show that the novel ester of a petroleum sulfonic acid and an aryl polyether alcohol is very effective in lowering the fluid loss of drilling fluids treated therewith.

Various modifications and alterations of this invention will become apparent to those skilled in the art, without departing from the scope and spirit of this invention, and it should be understood that the invention is not to be limited unduly to that set forth herein for illustrative purposes.

I claim:

1. In a process of drilling a well with well drilling tools, the step of circulating in said well a drilling fluid consisting essentially of a liquid medium, said liquid medium being one selected from a group consisting of oil, water, and emulsions of water and oil and having dispersed therein an ester of petroleum sulfonic acid and an alkyl aryl polyether alcohol having the general formula:

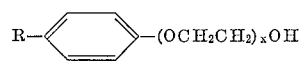

where R is an alkyl having 1 to 20 carbon atoms and $x$ is an integer from 1 to 30, said ester being present in an amount sufficient to lower the fluid loss of said drilling fluid.

2. The process according to claim 1 wherein said R is the alkyl radical:

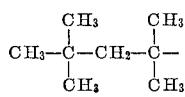

and $x$ is an integer from 7 to 10.

3. The process according to claim 2 wherein said drilling fluid is an aqueous drilling fluid.

4. The process according to claim 2 wherein said drilling fluid is an oil-in-water drilling fluid.

5. The process according to claim 2 wherein said drilling fluid is a water-in-oil drilling fluid.

6. The process according to claim 2 wherein said drilling fluid is an oil base drilling fluid.

References Cited by the Examiner

UNITED STATES PATENTS

| | | | |
|---|---|---|---|
| 2,208,581 | 7/1940 | Hoeffelman | 260—456 |
| 2,213,477 | 9/1940 | Steindorf et al. | 260—613 |
| 2,266,141 | 12/1941 | Adams | 260—456 |
| 2,555,794 | 6/1951 | Henkes | 252—8.5 |
| 2,589,949 | 3/1952 | Meadors | 252—8.5 |
| 2,831,013 | 4/1958 | Mark | 260—456 |
| 3,005,773 | 10/1961 | Allred | 252—8.5 |
| 3,006,845 | 10/1961 | Van Dyke et al. | 252—8.5 |
| 3,062,740 | 11/1962 | Reddie et al. | 252—8.5 |

FOREIGN PATENTS 709,478    5/1954    Great Britain.

OTHER REFERENCES

Rogers: Composition and Properties of Oil Well Drilling Fluids, second ed., pub. 1953 by Gulf Pub. Co. of Houston, Texas, pages 310, 311, 329, 332 and 333.

JULIUS GREENWALD, *Primary Examiner.*

ALBERT T. MEYERS, *Examiner.*